Figure 1:
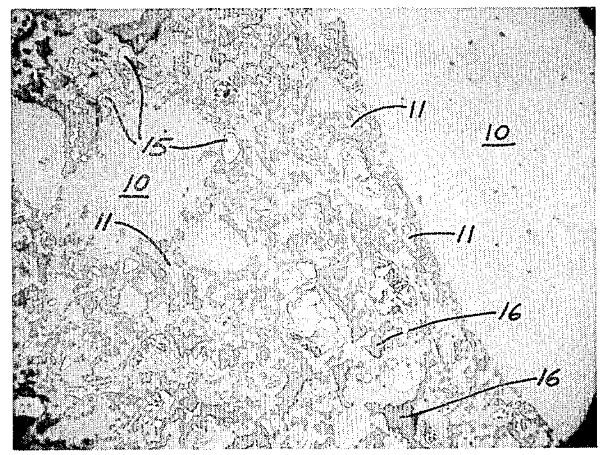

March 22, 1966 B. E. WISHON ET AL 3,241,989

ALUMINA REFRACTORIES

Filed July 9, 1965

INVENTORS.
BERHL E. WISHON &
DONALD F. STOCK
BY William C. Nealon
ATTORNEY

United States Patent Office 3,241,989 Patented Mar. 22, 1966

3,241,989
ALUMINA REFRACTORIES

Berhl E. Wishon, Bethel Park, and Donald F. Stock, Pittsburgh, Pa., assignors to Harbison-Walker Refractories Company, Pittsburgh, Pa., a corporation of Pennsylvania Filed July 9, 1965, Ser. No. 470,858
7 Claims. (Cl. 106—65)

This application is a continuation-in-part of application Serial Number 253,292 filed January 23, 1963 (and now abandoned in favor of the present application) of the same inventors, same title, and same assignee.

This invention relates to refractories of relatively high alumina content, by which is meant, for the purposes of this invention, refractories containing about 60% $Al_2O_3$, by oxide analysis.

High alumina refractories are generally classified by their $Al_2O_3$ content, into groups having 50, 60, 70, 80, 90, or 99% $Al_2O_3$, on the basis of an oxide analysis. Those containing 50 to 90% of $Al_2O_3$ have been made by blending various high alumina refractory materials; while those of the 99% content are made from high purity synthetic alumina, such as tabular alumina. Exemplary materials and typical $Al_2O_3$ contents therefor are as follows: Tabular alumina, 99%; calcined South American bauxite, 89%; calcined Alabama bauxite, 75%; calcined disapore, 74%; calcined kyanite, 56%.

From this listing, it should be clear that all but the tabular alumina are obtained by calcination of various crude aluminum ores. Sometimes, two of these materials are present as horizontally extending contiguous mineral veins or lenses. When this occurs, the various ores are separately recovered, and an intermediate material, having characteristics of the ores recovered, is wasted. An example of such practices is the recovery of Alabama bauxite and kaolin in the United States.

The kaolin so recovered is essentially all kaolinite, $Al_2O_3 \cdot 2SiO_2 \cdot 2H_2O$. The bauxite is about 40 parts kaolinite and about 60 parts gibbsite, $Al(OH)_3$ or $Al_2O_3 \cdot 3H_2O$. The material which is usually wasted is comprised of about 30 parts gibbsite and about 70 parts kaolinite. Thus, the material can be referred to as a bauxitic kaolin. Wasting of this material, because it has neither the desired properties of bauxite nor the desired properties of kaolin, has been distressing to many mine owners. It has a relatively high naturally-occurring $Al_2O_3$ content, which should be of some benefit. Accordingly, it is a primary object of this invention to provide for utilization of this type of material.

It is another object of this invention to provide refractory shapes, and batches for the preparation of such shapes, the major portion of which consists of a calcined bauxitic kaolin. These shapes are characterized by high density and strength, good spalling resistance for this type of refractory, and excellent resistance to disintegration in the presence of carbon monoxide. It is still another object of this invention to provide improved high alumina refractory shapes and batches for the fabrication thereof, which are particularly suited for lining blast furnace inwalls. And it is yet another object of this invention to provide improved high alumina refractory shapes particularly resistant to penetration by alkali.

Briefly, according to a preferred embodiment of this invention, we provide a size graded refractory batch consisting of about 60 parts calcined bauxitic kaolin in the range −6 mesh to fines; about 25 parts calcined Alabama bauxite as ball mill fines; and about 15 parts of very finely divided air floated ball clay. The calcined bauxitic kaolin can be mineralogically characterized as mullite, with an excess of silica. The silica is substantially all in the heat-altered form, cristobalite. This mineralogical character is obtained by calcining the crude bauxitic kaolin material to a temperature in excess of 2600° F. and preferably at about 2750° F. Higher temperatures can be used as long as vitreous phases are not caused to form.

Figure 2:
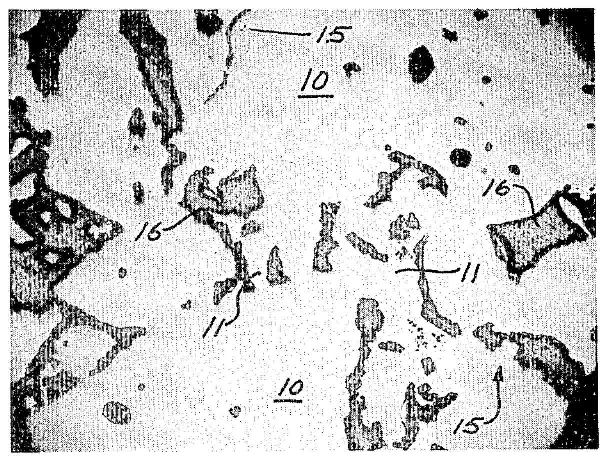

A better understanding, and further features and advantages of the practice of this invention, will become readily apparent to those skilled in the art by a study of the following detailed description and examples and by reference to the photomicrographs which serve as drawings. In these drawings, FIG. 1 is a photomicrograph (160×) of a polished section of a brick according to this invention fired at about 2600° F.; and FIG. 2 is a similar photomicrograph (160×) of a sample of a brick fired at 2820° F.

It should, of course, be understood that these examples are given by way of explanation and not by way of limitation. All size gradings are according to the Tyler series, unless otherwise specified. All chemical analyses, unless otherwise specified, are on the basis of an oxide analysis is conformity with conventional practices in reporting the chemical content of refractory materials. All analyses should be considered typical. All parts and percentages are by weight.

EXAMPLE I

About 85 parts of calcined bauxitic kaolin, −6 mesh to ball mill fines, and about 15 parts of air floated ball clay were dry mixed for about five minutes—then for an additional five minutes with about 5% water, based on the total weight of the dry solids in the batch. The calculated alumina content of this batch was about 54%. Shapes were made from this batch according to conventional power pressing techniques, at a pressure of about 4000 p.s.i. The shapes were dried overnight at room temperature (72° F.), and then for an additional 24 hours in an atmosphere of about 250° F. The dried shapes were fired to cone 16–17 (2600–2650° F.)

The fired shapes, after cooling, were subjected to physical testing. The shapes had an average density of 155 p.c.f. The modulus of rupture averaged 1630 p.s.i. The apparent porosity was only 15.1%. In an ASTM spalling test, in which the shapes were heated to 3000° F. and then cooled to room temperature and thereafter subjected to rapid cycling between about 2500° F. and about 500° F. to impose severe thermal shock on the shapes, there was no loss. There were one or two fine cracks perpendicular to the hot face. In a load test at 2640° F. under a 25 p.s.i. load for 90 minutes, the brick had an average linear subsidence of only 0.8%.

Prior commercially available high alumina brick, having an $Al_2O_3$ content of about 52%, were subjected to comparative tests. These brick had a modulus of rupture of 1300 p.s.i., had a porosity in excess of 20%, and in the load test, had a subsidence of upwards of 6%. These results were quite surprising, since the chemical analysis of the brick according to this invention and the comparative prior high alumina brick were quite similar. The most distinguishing feature for the batch used to make the brick of this invention was the mineralogical character of the calcined bauxitic kaolin grain, as set forth above.

EXAMPLE II

About 85 parts of calcined bauxitic kaolin, −6 mesh to fines, was mixed with 15 parts of crude kaolin, substantially all of which was −65 mesh and with 85% thereof passing a 150 mesh screen. The calculated alumina content for this mixture was about 56%. Brick were made from this batch using the same technique set forth in Example I. The average density for the resulting brick was 154 p.c.f. Modulus of rupture averaged 1620 p.s.i. The apparent porosity was 16.7%, somewhat higher than for Example I. In an ASTM spalling test, similar to that discussed under Example I, no loss occurred. Linear subsidence in the load test was only 0.9%.

EXAMPLE III

About 60 parts of calcined bauxitic kaolin, −6 mesh including fines; 25 parts of calcined Alabama bauxite, ball mill fines (nominally 70% −150 mesh); and about 15 parts of air floated ball clay, were mixed with about 4 parts, by weight, of water (based on the total weight of the dry solids in the batch). This batch was manufactured into shapes using substantially the same techniques (excepting an 8000 p.s.i. forming pressure was used) as set forth under Example I above. These shapes were burned at cone 18 (2680° F.). In physical testing, these shapes had an average modulus of rupture of 2450 p.s.i. The density was 159 p.c.f., and the porosity was only 13.8%. The calculated alumina content of this mixture was about 60%. In the ASTM panel spalling test, no loss occurred. In the 2640° F. load test, only 0.6% subsidence was measured.

Example III testing indicated that calcined bauxitic kaolin could be inter-mixed with calcined bauxite and ball clay to produce very good high alumina shapes. In fact, observing the modulus of rupture, density and porosity, they were superior to the batches of Examples I and II. Some improvement in properties, of course, resulted from the higher firing temperature and forming pressure.

Additional studies were undertaken which determined that crude bauxite could be used with our calcined bauxitic kaolin material to obtain satisfactory high alumina refractory products. However, as with the crude kaolin, this material should substantially all pass at least a 100 mesh screen.

Thus, broadly, according to this invention, we furnish superior high alumina refractory shapes which consist of from about 50 to about 90% of calcined bauxitic kaolin; from 5 to 20% of very finely divided (air floated, preferably) ball clay; with the remainder being selected from the group calcined and crude aluminum ores, calcined and crude kaolin, and alumina.

In all of the batches discussed above, substantially the same size grading was maintained. The size grading was typically as follows: 6 on 10 mesh, 10–15%; −10 on 28 mesh, 24–30%; −28 on 65 mesh, 13–17%; the remainder passing a 65 mesh screen. Over 50% of the −65 mesh fraction was comprised of other than the calcined bauxitic kaolin.

The preferred mixes of the invention consist of about 50 to 70% calcined bauxitic kaolin, −6 mesh to ball mill fines; 5 to 20% of ball clay, all of which passes a 150 mesh screen; the remainder being calcined Alabama bauxite, most of which (70% or more, by weight) passes a 150 mesh screen. A preferred specific mix, with which excellent results have been obtained, is that set forth in Example III above.

Using brick fabricated of a batch similar to that set forth in Example III, a series of tests was undertaken to determine their relative resistance to disintegration by carbon monoxide gas. After 500 hours in a 935° F. atmosphere of gas of 98% carbon monoxide content, the brick were unaffected. Negligible weight loss occurred. This established the applicability of this brick for fabricating the inwalls of a blast furnace.

Typical chemical analyses of the materials used in the above examples are as follows:

*Table II*

| | Calcined Alabama Bauxite, percent | Calcined Kaolin, percent | Crude Kaolin, percent | Crude Bauxite, percent | Air Floated Ball Clay, percent | Calcined Bauxitic Kaolin, percent |
|---|---|---|---|---|---|---|
| Silica ($SiO_2$) | 21.3 | 52.0 | 44.8 | 15.5 | 62.9 | 37.4 |
| Alumina ($Al_2O_3$) | 75.0 | 44.9 | 38.7 | 54.6 | 30.9 | 59.9 |
| Titania ($TiO_2$) | 2.6 | 1.6 | 1.4 | 1.9 | 1.4 | 2.0 |
| Iron Oxide ($Fe_2O_3$) | 1.1 | 1.3 | 1.1 | 0.8 | 2.6 | 0.9 |
| Lime (CaO) | 0.1 | 0.1 | 0.1 | 0.1 | 0.6 | 0.03 |
| Magnesia (MgO) | TR | 0.1 | 0.1 | TR | 0.8 | 0.03 |
| Alkalies | 0.1 | 0.3 | 0.3 | 0.1 | 0.8 | 0.05 |
| Ignition Loss | | | 13.9 | 27.2 | | |

The alkalies that attack blast furnace linings are normally deposited from a vapor phase and may react damagingly with the brickwork without the formation of any slag or melt. In fact, most evidence of alkali attack we have seen is "dry," with marked expansion of the brick from new mineral formation causing peeling or more serious disruption of the internal structure.

Brick according to this invention have excellent resistance to attack by such alkalies as are present in the blast furnace. This is due, to a great extent, to the heat altered silica in the form of cristobalite, which is found in our calcined bauxitic kaolin grain. The cristobalite, in some manner appears to react with the attacking alkalies, causing an extremely viscous melt to be formed, thereby substantially reducing penetration. The reduction in penetration is far greater than would be expected from a mere decrease in brick porosity.

Fired shapes according to this invention are characterized by substantially true mineral homogeneity, through both the grain and the matrix, i.e. both the grain and the matrix are mullite, with an excess of silica. The silica is in the heat-altered form, cristobalite. Further, since the total alkali content of the batch is kept below about 1%—and preferably below .5 of a percent, there is substantially no vitrification and microscopically, the brick components are crystalline. While the excess silica is substantially all in the form of cristobalite, some residual quartz can be detected. Some residual corundum ($Al_2O_3$) can be detected. Referring to the drawings which are photomicrographs of brick according to this invention, like reference numerals are used to designate like mineralogical phases in each of the photomicrographs shown. Both large particles 10 and finer particles 11 which make up the groundmass or matrix are of substantially identical mineralogical character, i.e. exhibit true mineralogical homogeneity being, in essence, mullite. Silica is present as cristobalite but this is not discernible at 160× magnification. Some widely dispersed islands of corundum 15 can be seen, however at 160×. The areas 16 are the resin in which the samples are mounted. As can be particularly seen from a study of FIG. 2, the mineralogical homogeneity extends through both coarser grains and matrix. In fact, there is such homogeneity that there almost seems to be a flowing together of matrix and coarse particles with substantially no discernible boundary area. Even in FIG. 1 which is a brick fired at a lower temperature than the brick in FIG. 2, there is evidence of this flowing together and substantial mineralogical homogeneity.

Having thus described the invention in detail and with sufficient particularity as to enable those skilled in the art to practice it, what we desire to have protected by letters patent is set forth in the following claims.

We claim:

1. A fired, high alumina refractory shape, made from a size graded refractory batch consisting essentially of, by weight, 50 to 90% calcined bauxitic kaolin, the remainder being selected material of the group consisting essentially of finely divided calcined and crude aluminum ores, finely divided calcined and crude kaolin, and finely divided ball clay, the selected material substantially all passing a 100 mesh screen, there being no more than about 1%, by weight, alkalies in the batch, said shape being substantially free of vitrification, being microscopically crystalline, and characterized by substantially true mineral homogeneity.

2. A fired, high alumina refractory shape, made from a size graded refractory batch consisting esentially of, by weight, 50 to 90% calcined bauxitic kaolin, the remainder being selected material of the group consisting essentially of finely divided calcined and crude aluminum ores, finely divided calcined and crude kaolin, and finely divided ball clay, the selected material substantially all passing a 100 mesh screen, and there being no more than about 1%, by weight, alkalies in the batch, said shape being substantially free of vitrification and characterized by mineral homogeneity through both coarser grain and matrix and consisting of mullite with silica in the form of cristobalite and dispersed deposits of corundum.

3. A fired shape according to claim 6 in which ball clay constitutes 5 to 20%, by weight of the batch.

4. A fired shape according to claim 6 in which at least 70% of the selected material passes a 150 mesh screen.

5. A fired shape according to claim 6, made from a batch consisting of 50 to 70% calcined bauxitic kaolin, 5 to 20% air floated ball clay, both by weight and based on the total weight of the batch, the remainder being calcined bauxite.

6. A fired, high alumina refractory shape, made from a size graded refractory batch consisting essentially of, by weight, 50 to 90% of a calcined material, before calcination said material consisting of about 30 parts, by weight, gibbsite and about 70 parts, by weight, kaolinite, the remainder of the batch being material selected from the group consisting essentially of finely divided calcined and crude aluminum ores, finely divided calcined and crude kaolin, and finely divided ball clay, the selected material substantially all passing a 100 mesh screen, and there being no more than about 1%, by weight, alkalies in the batch, said shape being substantially free of vitrification both through coarser grain and matrix, characterized by mineral homogeneity and consisting of mullite with silica in the form of cristobalite and dispersed deposits of corundum.

7. The shape of claim 6 in which said material, which is about 30 parts gibbsite and 70 parts kaolinite, has substantially the following oxide analysis, by weight:

| | Percent |
|---|---|
| Silica | 37.4 |
| Alumina | 59.9 |
| Titania | 2.0 |
| Iron oxide | 0.9 |
| Calcia | 0.03 |
| Magnesia | 0.03 |
| Alkalies | 0.05 |

References Cited by the Examiner

UNITED STATES PATENTS 1,802,298 4/1931 Willetts ............ 106—67

TOBIAS E. LEVOW, *Primary Examiner.*

J. E. POER, *Assistant Examiner.*